(12) United States Patent
Shrivastava

(10) Patent No.: US 11,107,228 B1
(45) Date of Patent: Aug. 31, 2021

(54) REALISTIC IMAGE PERSPECTIVE TRANSFORMATION USING NEURAL NETWORKS

(71) Applicant: Ford Global Technologies, LLC, Dearborn, MI (US)

(72) Inventor: Shubham Shrivastava, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/838,448

(22) Filed: Apr. 2, 2020

(51) Int. Cl.
*G06T 7/50* (2017.01)
*G06T 7/10* (2017.01)

(52) U.S. Cl.
CPC ............... *G06T 7/50* (2017.01); *G06T 7/10* (2017.01); *G06T 2207/10024* (2013.01); *G06T 2207/10028* (2013.01); *G06T 2207/20084* (2013.01); *G06T 2207/30244* (2013.01)

(58) Field of Classification Search
CPC ............ G06T 7/50–543; G06T 7/10; G06T 2207/10024; G06T 2207/10028; G06T 2207/20084; G06T 2207/30244; G06T 11/00
See application file for complete search history.

(56) References Cited

U.S. PATENT DOCUMENTS

| 10,452,927 | B2 | 10/2019 | Stojanović et al. | |
|---|---|---|---|---|
| 2020/0334894 | A1* | 10/2020 | Long | G06K 9/629 |
| 2021/0065391 | A1* | 3/2021 | Tran | G06T 7/579 |

FOREIGN PATENT DOCUMENTS

| CN | 110378838 | A | | 10/2019 | |
|---|---|---|---|---|---|
| GB | 2576548 | A | * | 2/2020 | G06T 5/005 |
| NO | 2019230339 | A1 | | 12/2019 | |

OTHER PUBLICATIONS

"SynSin: End-to-end View Synthesis from a Single Image" Olivia Wiles, Georgia Gkioxari, Richard Szeliski, Justin Johnson arXiv:1912.08804v1 (Year: 2019).*

* cited by examiner

*Primary Examiner* — Sean T Motsinger
(74) *Attorney, Agent, or Firm* — Frank A. MacKenzie; Bejin Bieneman PLC

(57) ABSTRACT

The present disclosure discloses a system and a method. In example implementations, the system and the method can include receiving an image having a first perspective; generating, via a deep neural network, a depth map corresponding to the image having the first perspective; generating, via the deep neural network, a point cloud representation based on the depth map; projecting the point cloud representation onto a point cloud representation corresponding to an image having a second perspective; generating a depth map corresponding to the image having the second perspective; and generating a synthetic image having the second perspective based on the depth map corresponding to the image having the second perspective and a semantic segmentation map corresponding to the image having the first perspective, wherein the second perspective is different from the first perspective.

20 Claims, 8 Drawing Sheets

REALISTIC IMAGE PERSPECTIVE TRANSFORMATION USING NEURAL NETWORKS

BACKGROUND

Deep neural networks (DNNs) can be used to perform many image understanding tasks, including classification, segmentation, and captioning. Typically, DNNs require large amounts of training images (tens of thousands to millions). Additionally, these training images typically need to be annotated for the purposes of training and prediction.

DETAILED DESCRIPTION

Figure 1:
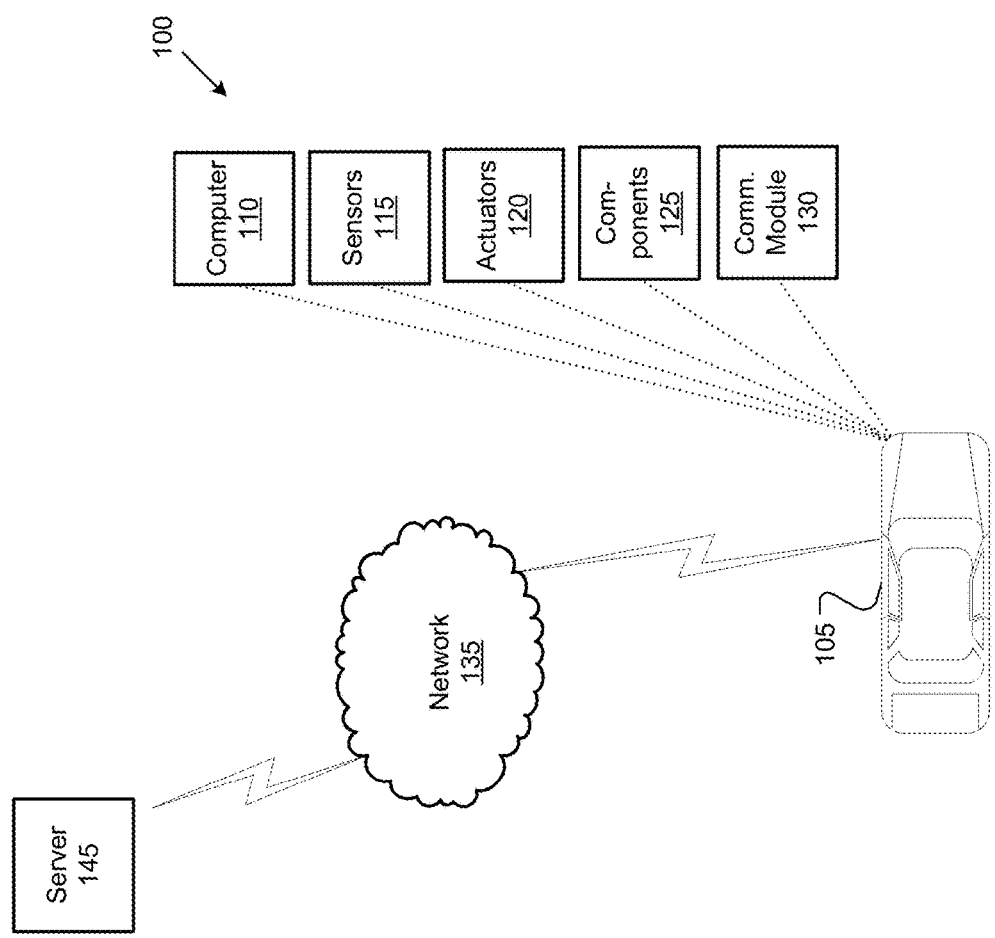
FIG. 1 is a diagram of an example vehicle system.

A system can include a computer including a processor and a memory. The memory includes instructions such that the processor is programmed to receive an image having a first perspective; generate, via a deep neural network, a depth map corresponding to the image having the first perspective; generate, via the deep neural network, a point cloud representation based on the depth map; project the point cloud representation onto a point cloud representation corresponding to an image having a second perspective; generate a depth map corresponding to the image having the second perspective; and generate a synthetic image having the second perspective based on the depth map corresponding to the image having the second perspective and a semantic segmentation map corresponding to the image having the first perspective, wherein the second perspective is different from the first perspective.

In other features, the processor is further programmed to generate the point cloud representation corresponding to the image having the second perspective based on a camera pose transformation matrix.

In other features, the camera pose transformation matrix comprises a rotation matrix and a translation matrix.

In other features, the point cloud representation corresponding to the image having the second perspective is calculated according to $$\begin{bmatrix} x' \\ y' \\ z' \end{bmatrix} = [R^{-1}] \left\{ \begin{bmatrix} x \\ y \\ z \end{bmatrix} - [T] \right\}, \text{ where } \begin{bmatrix} x' \\ y' \\ z' \end{bmatrix}$$

comprises point cloud coordinates for the point cloud representation corresponding to the image having the second perspective, $R^{-1}$ is an inverse matrix of the rotation matrix, $$\begin{bmatrix} x \\ y \\ z \end{bmatrix}$$

comprises point cloud coordinates for the point cloud representation corresponding to the image having the first perspective, and [T] comprises the translation matrix.

In other features, the deep neural network comprises an encoder-decoder architecture.

In other features, the deep neural network comprises a conditional generative adversarial network.

In other features, the image having the first perspective is captured by a vehicle camera sensor.

In other features, the image having the first perspective comprises a Red-Blue-Green (RGB) image.

In other features, the processor is further programmed to operate a vehicle based on the synthetic image having the second perspective.

In other features, the deep neural network includes a discriminator that generates a prediction indicative of whether synthetic image having the second perspective is machine-generated or is sourced from a real data distribution.

A method includes receiving an image having a first perspective; generating, via a deep neural network, a depth map corresponding to the image having the first perspective; generating, via the deep neural network, a point cloud representation based on the depth map; projecting the point cloud representation onto a point cloud representation corresponding to an image having a second perspective; generating a depth map corresponding to the image having the second perspective; and generating a synthetic image having the second perspective based on the depth map corresponding to the image having the second perspective and a semantic segmentation map corresponding to the image having the first perspective, wherein the second perspective is different from the first perspective.

In other features, the method further includes generating the point cloud representation corresponding to the image having the second perspective based on a camera pose transformation matrix.

In other features, the camera pose transformation matrix comprises a rotation matrix and a translation matrix.

In other features, the point cloud representation corresponding to the image having the second perspective is calculated according to $$\begin{bmatrix} x' \\ y' \\ z' \end{bmatrix} = [R^{-1}] \left\{ \begin{bmatrix} x \\ y \\ z \end{bmatrix} - [T] \right\}, \text{ where } \begin{bmatrix} x' \\ y' \\ z' \end{bmatrix}$$

comprises point cloud coordinates for the point cloud representation corresponding to the image having the second perspective, $R^{-1}$ is an inverse matrix of the rotation matrix, $$\begin{bmatrix} x \\ y \\ z \end{bmatrix}$$

comprises point cloud coordinates for the point cloud representation corresponding to the image having the first perspective, and [T] comprises the translation matrix.

In other features, the deep neural network comprises an encoder-decoder architecture.

In other features, the deep neural network comprises a conditional generative adversarial network.

In other features, the image having the first perspective is captured by a vehicle camera sensor.

In other features, the image having the first perspective comprises a Red-Blue-Green (RGB) image.

In other features, the method further includes operating a vehicle based on the synthetic image having the second perspective.

In other features, the deep neural network includes a discriminator that generates a prediction indicative of whether synthetic image having the second perspective is machine-generated or is sourced from a real data distribution.

Autonomous vehicles typically employ perception algorithms, or agents, to perceive the environment around the vehicle. However, training the perception algorithms typically requires large amounts of data. The objects of interest may include other vehicles, trailers, pedestrians, street markings, signs, or the like. However, the synthetic data may not appear "real." As a result, the training of perception algorithms using synthetic data may not correspond to the training of perception algorithms using real, i.e., non-generated, data.

For example, current computer vision techniques use the homography matrix computed using a set of matching pixels coordinates between two perspectives to warp one to another. This, however, can introduce distortion and the image appears stretched due to the fact that, not all the pixel information is available during perspective transforms to reconstruct a realistic-looking image.

A camera looking at a vehicle from behind has no information about how the vehicle may appear from the sides or top. Computer Vision techniques to warp image such that the newly constructed image is from the perspective of a camera looking at the vehicle from the side or top distorts the image to a degree that, in some cases, the vehicle is not recognizable. The ability to generate an image from a different perspective would help algorithms to improve the solutions to challenges such as object detection and localization.

The present disclosure is directed to deep neural networks that generates synthetic images having a different perspective than an input image. For example, an input image having a first perspective may be captured by a camera. As described herein, the domain translation network may employ an encoder-decoder architecture. The encoder portion may encode the image having the first sequence into a latent representation of the images. The decoder portion may then receive one or more matrices and the latent representation to generate depth maps that can be used to construct point cloud representations of the input image. The point cloud representation can be used to map points to a point cloud corresponding to an image having the second perspective. A depth map can then be constructed and used to generate the synthetic image having the second perspective.

In various implementations, the deep neural networks may comprise conditional generative adversarial networks (cGANs). These networks can use an additional input, such as an input vector, to condition the output of the deep neural networks. For instance, a generator may use an input vector that specifies a specific condition or characteristic, e.g., a label associated with an image or an image perspective, to condition the output of the generator. Within the present disclosure, the conditional inputs may comprise matrices associated with a camera, an image distribution, and the like.

While the present disclosure describes a vehicle system and a server, it is understood that any suitable computer system may be used to perform the techniques and/or the functionality of the adversarial neural network described herein.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc.

Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
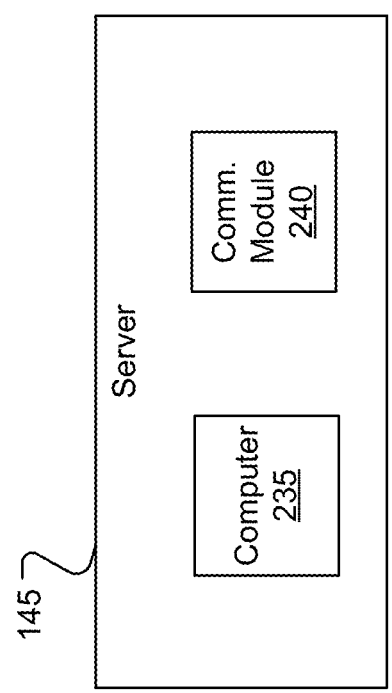
FIG. 2 is a diagram of an example server within the system.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3:
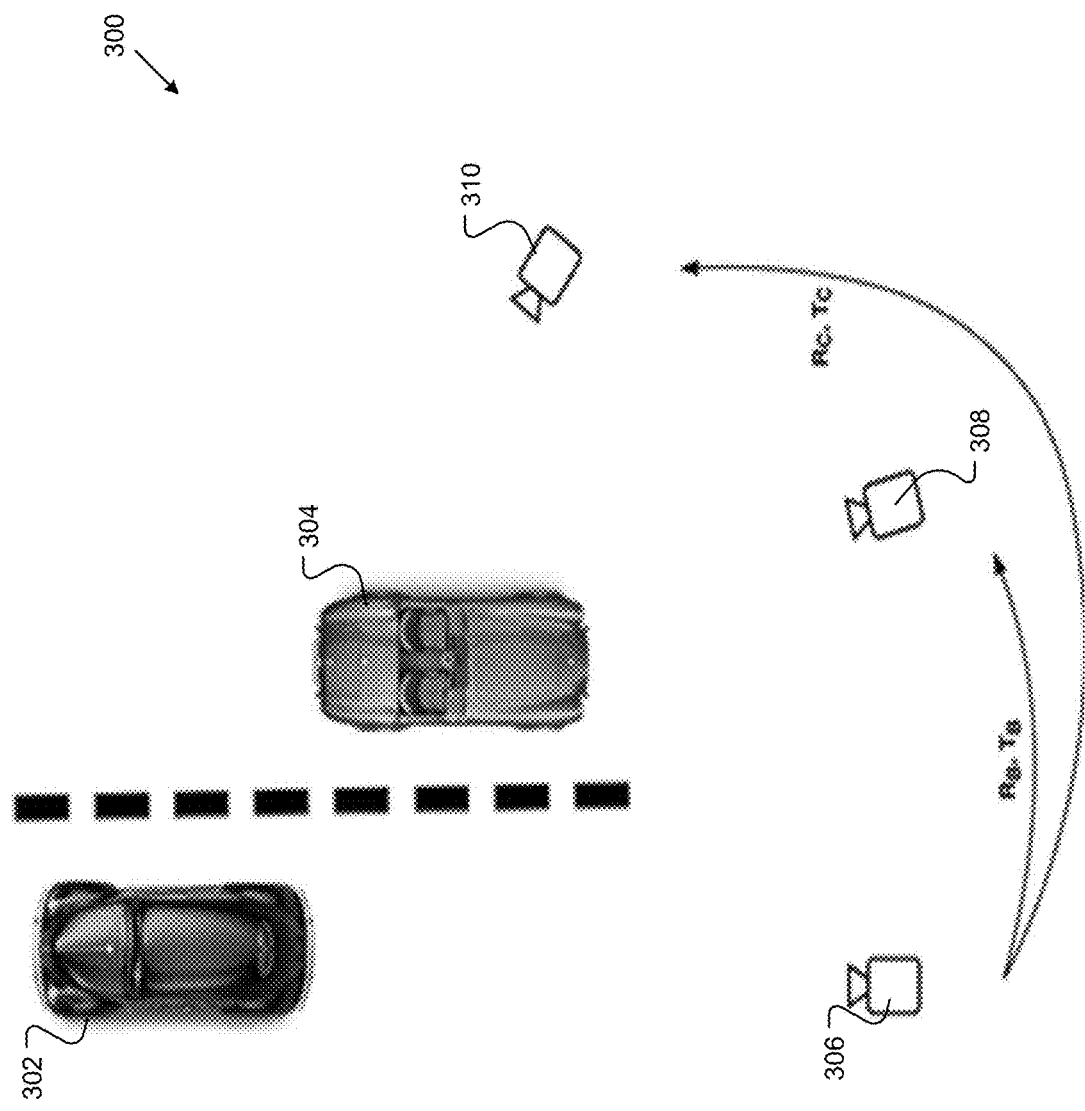
FIG. 3 is a diagram illustrating various image perspectives that can be generated using a deep neural network.

One or more example systems are described that can generate synthetic images from various perspectives, e.g., poses, based on an image captured by a camera sensor 115 from a first perspective. The synthetic images can be generated from an image at a first perspective as long as a portion of the scene from the various perspectives are depicted in the image from the first perspective. FIG. 3 illustrates an example environment 300 including vehicles 302, 304. The camera sensor 115 is illustrated as being positioned such that the camera sensor 115 can capture images from a first perspective 306. As described herein, the computer 110 includes a deep neural network that can generate synthetic images from a second perspective 308 and/or a third perspective 310. The deep neural network can utilize, in part, rotation matrices $R_B$, $R_C$ and transformation matrices $T_B$, $T_C$ to generate the synthetic images for the respective perspectives. The rotation matrices and the transformation matrices can be used to form a camera pose transformation matrix, which is used to convert a point cloud corresponding to an image from a first perspective to a point cloud corresponding to an image from a desired perspective. The rotation matrices and the transformation matrices may be provided as input to the deep neural networks described herein.

Figure 4:
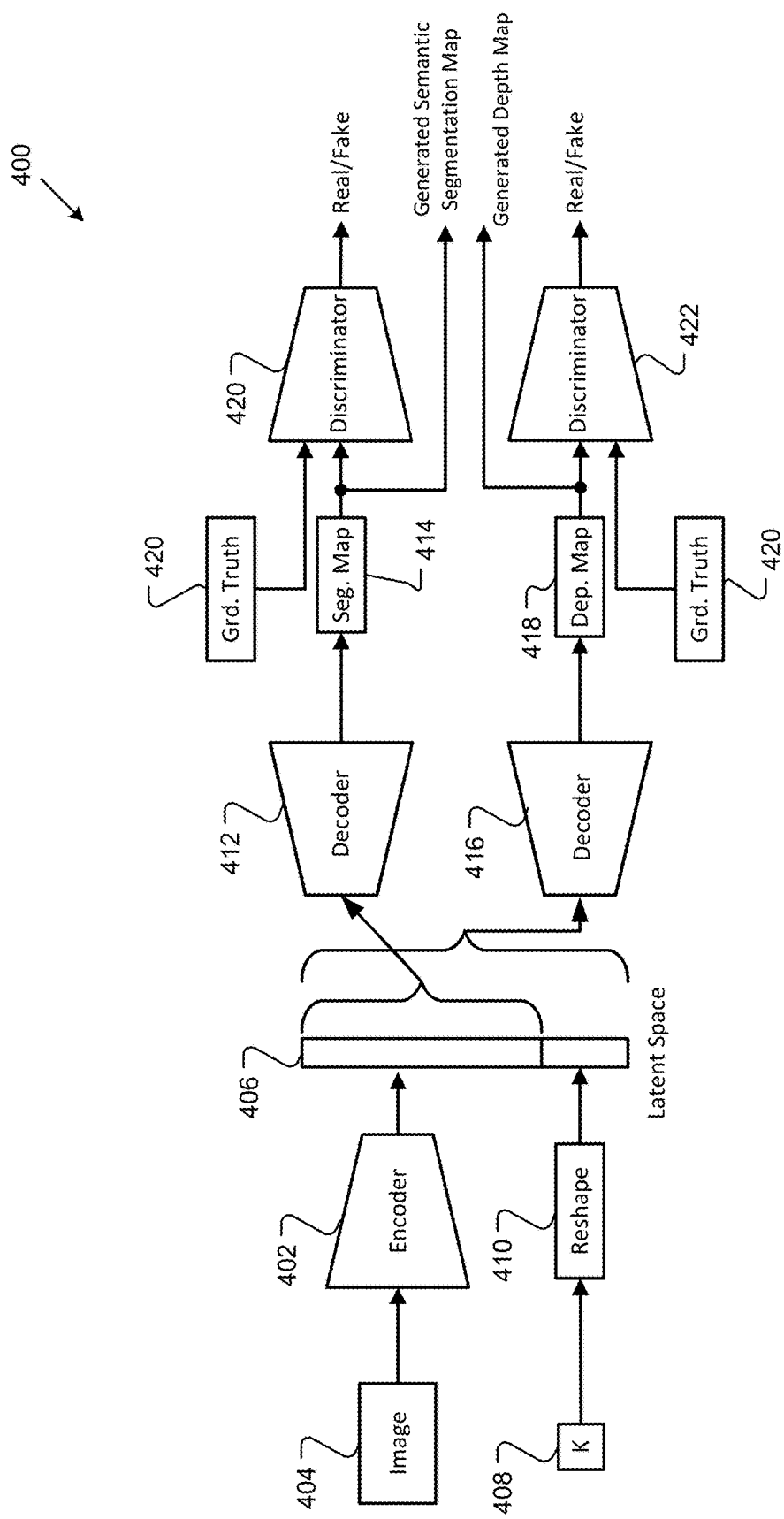
FIG. 4 is a diagram of an example deep neural network.

Referring to FIG. 4, a deep neural network 400 is illustrated that generates a depth map and a semantic segmented map based on an input image. The deep neural network 400 may comprise an adversarial neural network. The adversarial neural network can be a software program that can be loaded in memory and executed by a processor in the vehicle 105 and/or the server 145, for example. As shown, the adversarial neural network 300 includes a generator implemented in an encoder-decoder architecture and a discriminator. Within the present context, the generator and the discriminator comprise a conditional generative adversarial network (cGAN). The GAN is a deep neural network that employs a class of artificial intelligence algorithms used in machine learning and implemented by a system of two neural networks contesting each other in an adversarial zero-sum game framework.

An encoder 402 receives the image 404 captured by the camera sensor 115. The image 404 may comprise a Red-Green-Blue (RGB) image captured by the camera sensor 115. The encoder 402 encodes the received image into a latent, i.e., hidden, representation space (e.g., latent features)

406. An intrinsic camera matrix 412 for the camera sensor 115 is reshaped at a reshaping layer 410, and the reshaped camera matrix is output to the latent representation space 406. As shown, the encoded image data is provided to a semantic segmentation decoder 412 that generates a semantic segmentation map 414 corresponding to the encoded image data from a first perspective. The generated semantic segmentation map comprises a map that associates each pixel of the encoded image with a class label, e.g., road label, vehicle label, background label, etc.

A depth decoder 416 receives the encoded image data and the reshaped camera matrix as input and generates a depth map 418 corresponding to the encoded image. The reshaped camera matrix comprises a conditional input to the adversarial framework. The generated depth map 418 includes information about a distance between a surface and an object within the encoded image. In an implementation, the depth map 418 is generated using information within the encoded image data and information within the reshaped camera matrix.

The deep neural network 400 also includes discriminators 420, 422. The discriminators 420, 422 generate predictions based on its respective inputs. The prediction is indicative of whether the received input is machine-generated by the generator(s) or is sourced from a real data distribution. The discriminator 420 receives a ground-truth semantic segmentation map corresponding to the image 404 and the generated semantic segmentation map 414 for training purposes. The discriminator 422 receives a ground-truth depth map 420 corresponding to the image 404 and the generated depth map 418 for training purposes.

Using a loss function, the encoder-decoder architecture, e.g., generators, and the discriminators are updated via suitable processes, such as backpropagation based on the discriminators 420, 422 predictions of whether the input is sourced from a real data distribution or is synthetic, e.g., machine-generated.

The loss function for the generative adversarial network for generating the semantic segmentation map is shown in the following equations:

$$\min_G \max_D \mathcal{L}_{semseg_{GAN}}(G, D) = \quad \text{(Equation 1)}$$
$$E_{x^A_{RGB}, x^A_{semseg}}[\log(D(x^A_{semseg}))] +$$
$$E_{x^A_{RGB}, x'^A_{semseg}}[\log(1 - D(x'^A_{semseg}))],$$

$$\min_G \max_D \mathcal{L}_{semseg_{GAN}}(G, D) = \quad \text{(Equation 2)}$$
$$E_{x^A_{RGB}, x^A_{semseg}}[\log(D(x^A_{semseg}))] +$$
$$E_{x^A_{RGB}, x'^A_{semseg}}[\log(1 - D(x'^A_{semseg}))],$$

$$\mathcal{L}_{depth} = E_{x^A_{RGB}, x^A_{depth}}\left[\|x^A_{depth} - x'^A_{depth}\|_2\right], \quad \text{(Equation 3)}$$

$$\mathcal{L}_{semseg} = \quad \text{(Equation 4)}$$
$$\frac{1}{M \cdot N} \sum_{classes \in M} \sum_{pixels \in N} [z^{semseg}_{(classes, pixels)} \log(z'^{semseg}_{(classes, pixels)})) +$$
$$(1 - z^{semseg}_{(classes, pixels)}) \log(1 - z'_{(classes, pixels)})],$$

$$\mathcal{L}^{complete}_{depth} = \min_G \max_D \mathcal{L}_{depth_{GAN}}(G, D) + \lambda_1 \cdot \mathcal{L}_{depth}, \quad \text{(Equation 5)}$$

$$\mathcal{L}^{complete}_{semseg} = \min_G \max_D \mathcal{L}_{semseg_{GAN}} + L_{semseg}, \quad \text{(Equation 6)}$$

where G comprises the Generator function, D comprises the Discriminator function, $\mathcal{L}_{semseg_{GAN}}$ comprises the semantic segmentation map generation loss function, $x^A_{RGB}$ comprises the Ground-Truth RGB Image at the first perspective, $x^A_{depth}$ comprises the Ground-Truth Depth Map at the first perspective, $x'^A_{depth}$ comprises the Predicted Depth Map at the first perspective, $x^A_{semseg}$ comprises the Ground-Truth Semantic Segmentation Map at the first perspective, $x'^A_{semseg}$ comprises the Predicted Semantic Segmentation Map at the first perspective, $x^B_{RGB}$ comprises the Ground-Truth RGB Image at Camera Pose B, $x'^B_{RGB}$ comprises the Predicted RGB Image at Camera Pose B, $x^B_{depth}$ comprises the Ground-Truth Depth Map at Camera Pose B, $x'^B_{depth}$ comprises the Predicted Depth Map at Camera Pose B, $E_{x^A_{RGB}, x^A_{depth}}$ comprises the Expected value over all real RGB and Depth map, $E_{x^A_{RGB}, x^A_{semseg}}$ comprises the Expected value over all real RGB and synthesized semantic segmentation map, $\min_G \max_D$ comprises the minmax function where the discriminator works to maximize the value and the generator works to minimize the value, where $\mathcal{L}_{depth}$ comprises the depth map reconstruction loss, $\mathcal{L}_{semseg}$ comprises the semantic segmentation reconstruction loss, $\mathcal{L}^{complete}_{depth}$ comprises the complete GAN loss for depth synthesis, $\mathcal{L}^{complete}_{semseg}$ comprises the complete GAN loss for the semantic segmentation map synthesis, and $\lambda_1$ is used to provide a weighted depth map reconstruction loss as an additive component of the complete depth reconstruction loss.

Once trained, encoder-decoder architecture generates and outputs the generated depth maps 418 and semantic segmentation maps 414. The computer 120 uses the generated depth map to generate a point cloud. In an example implementation, given the generated depth map 418, a point cloud representation of the generated depth map 418 is generated using the following equations:

$$u = x\frac{f_x}{z} + o_x, \quad \text{(Equation 7)}$$

$$v = y\frac{f_y}{z} + o_y, \quad \text{(Equation 8)}$$

In Equations 8 and 9, (x,y,z) are world coordinates, $(f_x, f_y)$ are the focal length of the camera sensor 115, (u, v) are image coordinates, and $(o_x, o_y)$ are the image center of the camera sensor 115.

The following equations provide the three-dimensional (3D) coordinates for the point cloud:

$$z = x'^A_{depth}(u, v), \quad \text{(Equation 10)}$$

$$x = (u - o_x)\frac{z}{f_x}, \quad \text{(Equation 11)}$$

$$y = (v - o_y)\frac{z}{f_y}, \quad \text{(Equation 12)}$$

In Equation 10, the term $x'^A_{depth}$ represents the generated depth map 418 based on the image 404 captured from the first perspective.

Using the generated 3D coordinates for the point cloud (x,y,z), the computer 120 can use a camera pose transformation matrix to transform the point cloud (x,y,z) coordinates corresponding to the first perspective to point cloud (x', y', z') coordinates corresponding to a second perspective, e.g., desired camera perspective or pose. The camera pose transformation matrix can comprise a 3×3 rotation matrix $R_{3\times 3}$, and translation matrix, $T_{3\times 1}$. The camera pose transformation matrix can comprise input representing the desired image perspective, e.g., the second perspective. The point cloud (x', y', z') coordinates corresponding to the second perspective can be generated according to:

$$\begin{bmatrix} x' \\ y' \\ z' \end{bmatrix} = [R^{-1}] \left\{ \begin{bmatrix} x \\ y \\ z \end{bmatrix} - [T] \right\}. \quad \text{(Equation 13)}$$

Using the generated point cloud (x', y', z') coordinates, each point can then be projected onto a new depth map corresponding to the image having the second perspective. The translation matrix and/or the rotation matrix can be provided as inputs to the computer 115 based on the desired perspective. In an implementation, the depth map can be generated according to the following equations:

$$u' = x' \frac{f_x}{z'} + o_x, \quad \text{(Equation 14)}$$

$$v' = y' \frac{f_y}{z'} + o_y, \quad \text{(Equation 15)}$$

$$x'^B_{depth}(u', v') = z', \quad \text{(Equation 16)}$$

where $x'^B_{depth}$ represents the depth map corresponding to the second perspective.

Figure 5:
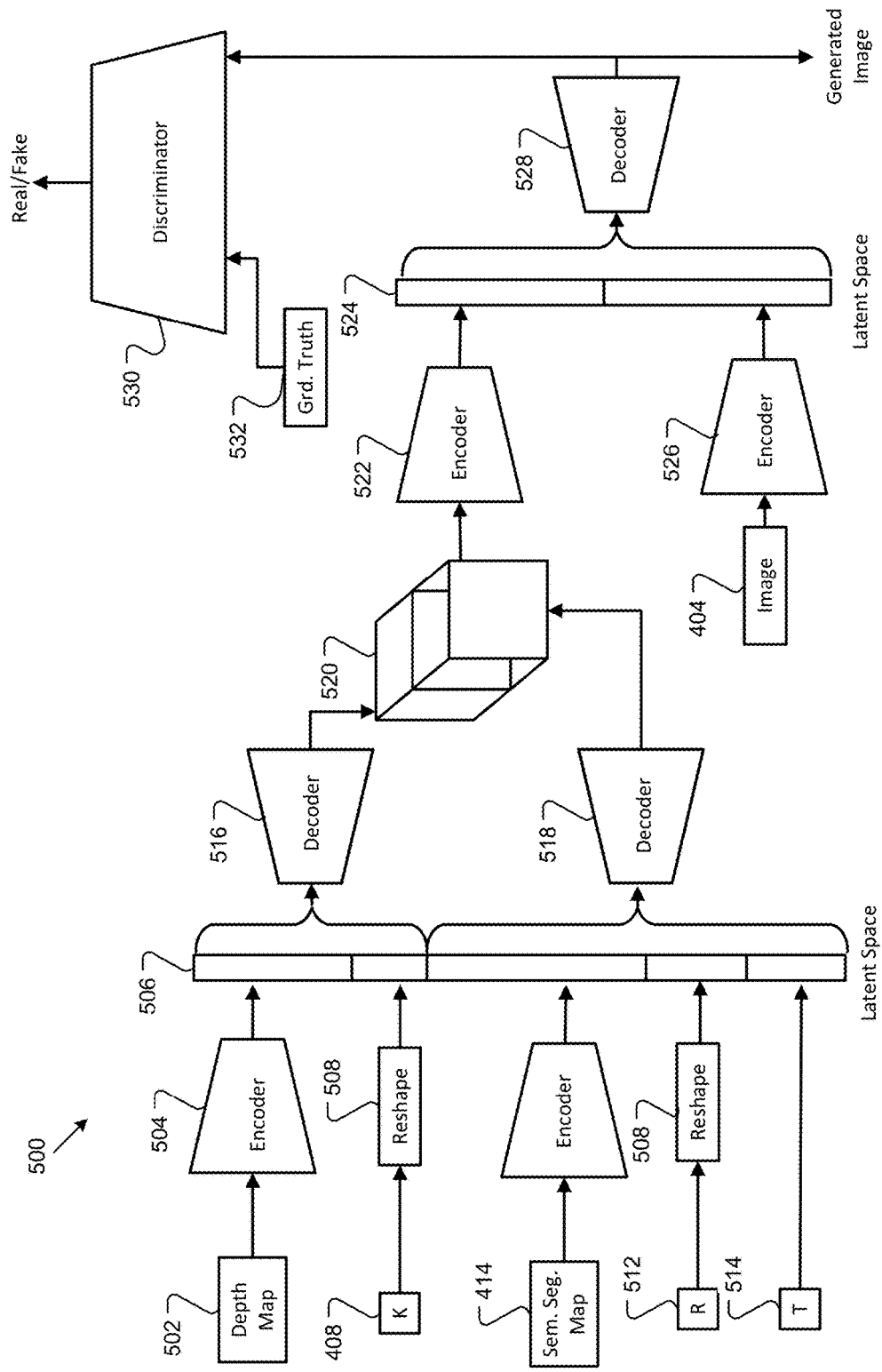
FIG. 5 is a diagram of an example deep neural network.

FIG. 5 illustrates an example deep neural network 500 that generates an image corresponding to the second perspective, a perspective that is different from the perspective of the image 404 captured by the camera sensor 115. In an example implementation, the image corresponding to the second perspective comprises an RGB image. The image corresponding to the second perspective includes the same scene characteristics as the image 404, and the deep neural network 500 conditions the generated image on the RGB distribution of the image 404. Similar to the deep neural network 400, the deep neural network 500 comprises an adversarial network including generators, e.g., encoder-decoders, and discriminators as described in greater detail below.

The deep neural network 500 can infer the object information captured within the image 404 by conditioning on the semantic segmentation map 414, the rotation matrix R, and the translation matrix T. The camera intrinsic matrix K is also used for conditioning the depth map encoder of the deep neural network 500 such that the generator learns the relationship between the depth map, the 2D projected RGB image, and the camera intrinsic matrix.

The depth map 502 corresponding to the image having the second perspective is input to a depth map encoder 504 that encodes the depth map 502 into the latent space 506. The camera intrinsic matrix K 408 is input to a reshaping layer 508 to generate a reshaped camera intrinsic matrix. The generated semantic segmented map 414 is provided as input to a semantic segmentation map encoder 510 that encodes the semantic segmentation map 414 into the latent space 506. The rotation matrix R 512 is provided to the reshaping layer 508 to generate a reshaped rotation matrix, which is then provided to the latent space 506. The translation matrix T 514 is provided to the latent space 506.

A depth map decoder 516 receives the encoded depth map corresponding to the second perspective and the reshaped camera intrinsic matrix to generate a decoded representation of the encoded depth map and reshaped camera intrinsic matrix. A semantic segmentation transformed map decoder 518 receives, as input, the encoded semantic segmentation map, the reshaped rotation matrix, and the translation matrix 514 and generates a decoded representation of the encoded semantic segmentation map, the reshaped rotation matrix, and the translation matrix 514. The decoded representations generated by the decoders 516, 518 are used to generate a decoupled segmented depth map 520.

A decoupled segmented depth map encoder 522 receives the decoupled segmented depth map 520 as input and generates an encoded latent representation of the decoupled segmented depth map 520, which is provided to a latent space 524. The deep neural network 500 also includes an image color distribution encoder 526 that receives the input image 404 and generates an encoded representation of the image distribution, such as an RGB distribution, based on the input image 404. The encoded latent representation of the image distribution is provided to the latent space 524. A transformed image decoder 528 generates the image corresponding to the second perspective, e.g., a synthetic image, based on the encoded latent representation of the decoupled segmented depth map 520 and the encoded representation of the image distribution.

The deep neural network 500 also includes a discriminator 530. The discriminator 530 generates predictions based on its received input. For example, the discriminator 530 can receive a ground-truth image 532 corresponding to the second perspective and the synthetic image corresponding to the second perspective. The prediction is indicative of whether the received input is machine-generated by the generator(s) or is sourced from a real data distribution.

Using a loss function, the encoder-decoder architecture, e.g., generators, and the discriminators are updated via suitable processes, such as backpropagation based on the discriminator 530 predictions of whether the input is sourced from a real data distribution or is synthetic.

$$\min_G \max_D \mathcal{L}_{RGB_{GAN}}(G,D) = E_{x^B_{depth}, x^B_{RGB}}[\log(D(x^B_{depth}))] + E_{x^B_{depth}, x^B_{RGB}}[\log(1 - D(x^B_{RGB}))] \quad \text{(Equation 17)},$$

$$\mathcal{L}_{RGB}^{complete} = \min_G \max_D \mathcal{L}_{RGB_{GAN}}(G,D) + \lambda_2 \cdot \mathcal{L}_{MES\_RGB} \quad \text{(Equation 18)}$$

where $\lambda_2$ is used to provide a weighted RGB reconstruction loss as an additive component of the complete loss, $\mathcal{L}_{MSE\_RGB}$ is the reconstruction loss for the RGB image synthesis, and $\mathcal{L}_{RGB}^{complete}$ is the complete GAN loss for RGB image synthesis.

Figure 6:
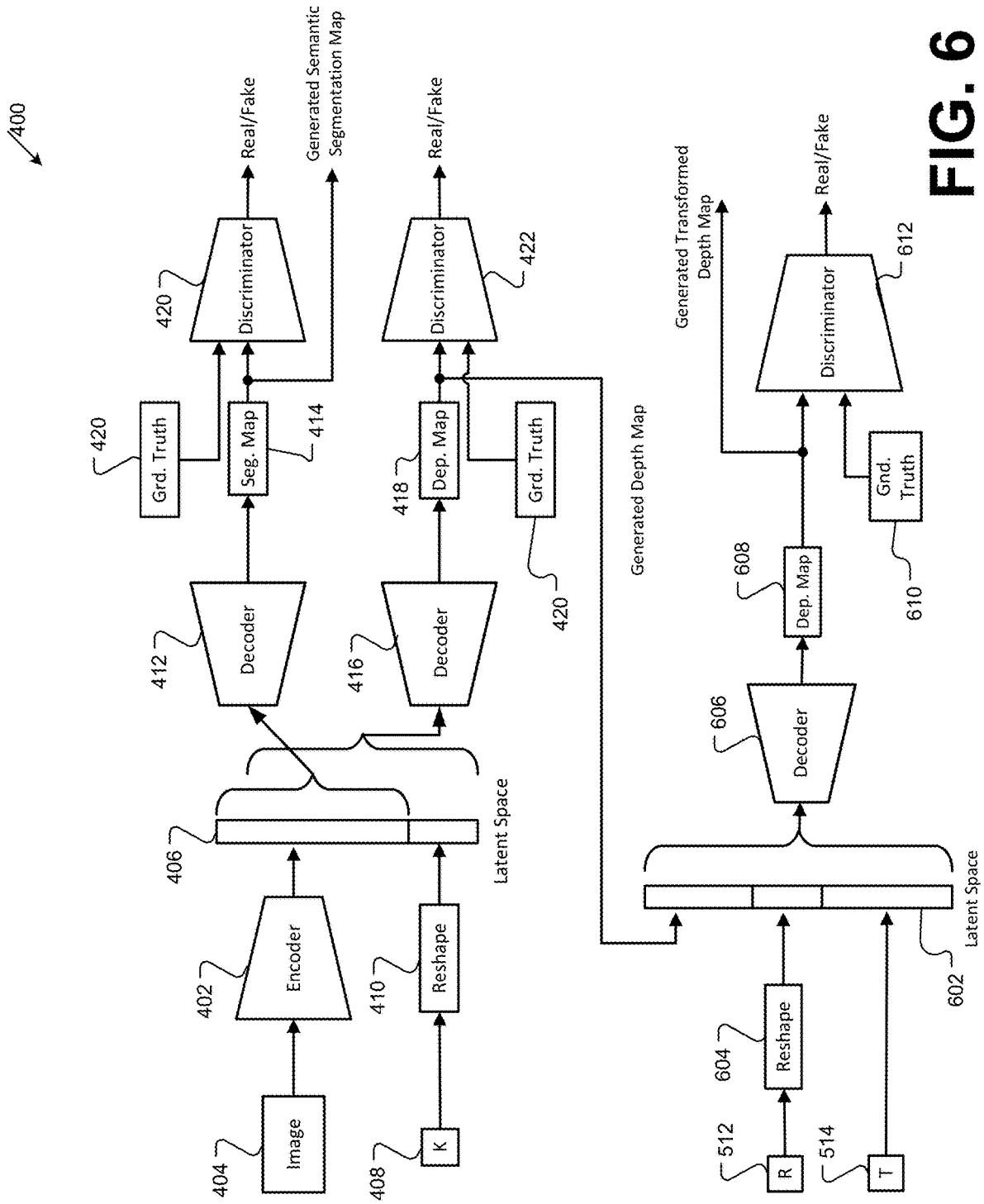
FIG. 6 is a diagram of an example deep neural network.

FIG. 6 illustrates an example deep neural network 600 that receives an input image from a camera sensor 115 captured from a first perspective and generates a depth map of image corresponding to a second perspective. The generated depth map 418, which is described above with respect to FIG. 4, is provided to a latent space 602. The rotation matrix R 512 is provided to the reshaping layer 604 to generate a reshaped rotation matrix, which is provided to the latent space 602. The translation matrix T 514 is also provided to the latent space 602.

The depth map 418, the reshaped rotation matrix, and the translation matrix T are provided to a transformed depth map decoder 606, and the transformed depth map decoder 606 generates the depth map 608 corresponding to an image having the second perspective. During training, the generated depth map 608 and ground truth 610 are provided to a discriminator 612 for evaluation. Similar to the discriminators described above, the discriminator 612 generates predictions indicative of whether the input is sourced from a real data distribution or is machine generated. The predictions can be used to update the weights of the encoder-decoder architecture and/or the discriminator. In various implementations, the ground truth 610 comprises a real image having the second perspective. The generated transformed depth map is provided to the deep neural network 500 such that the deep neural network 500 can generate an image, such as an RGB image, having the second perspective.

Figure 7:
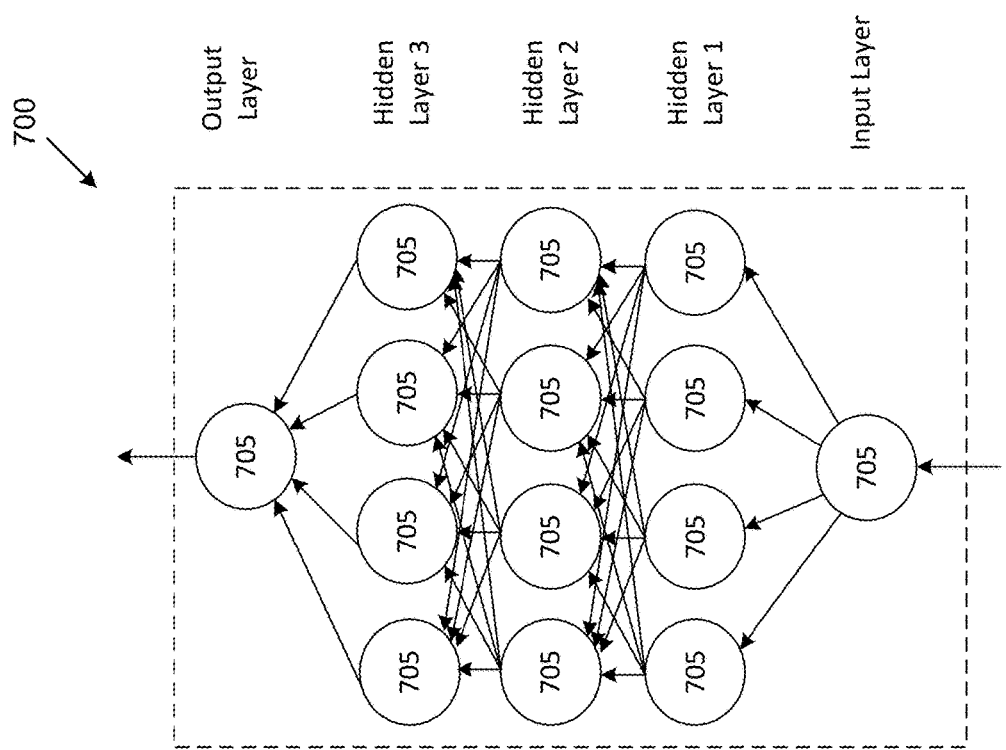
FIG. 7 is diagram of an example deep neural network.

FIG. 7 is a diagram of an example deep neural network (DNN) 700. The DNN 700 may be representative of one or more of the deep neural networks described above. The DNN 700 includes multiple nodes 705, and the nodes 705 are arranged so that the DNN 700 includes an input layer, one or more hidden layers, and an output layer. Each layer of the DNN 700 can include a plurality of nodes 705. While FIG. 7 illustrates three (3) hidden layers, it is understood that the DNN 700 can include additional or fewer hidden layers. The input and output layers may also include more than one (1) node 705.

The nodes 705 are sometimes referred to as artificial neurons 705, because they are designed to emulate biological, e.g., human, neurons. A set of inputs (represented by the arrows) to each neuron 705 are each multiplied by respective weights. The weighted inputs can then be summed in an input function to provide, possibly adjusted by a bias, a net input. The net input can then be provided to activation function, which in turn provides a connected neuron 705 an output. The activation function can be a variety of suitable functions, typically selected based on empirical analysis. As illustrated by the arrows in FIG. 7, neuron 705 outputs can then be provided for inclusion in a set of inputs to one or more neurons 705 in a next layer.

The DNN 700 can be trained to accept data as input and generate an output based on the input. The DNN 700 can be trained with ground truth data, i.e., data about a real condition or state. For example, the DNN 700 can be trained with ground truth data or updated with additional data by a processor. Weights can be initialized by using a Gaussian distribution, for example, and a bias for each node 705 can be set to zero. Training the DNN 700 can including updating weights and biases via suitable techniques such as back-propagation with optimizations. Ground truth data can include, but is not limited to, data specifying objects within an image or data specifying a physical parameter, e.g., angle, speed, distance, or angle of object relative to another object. For example, the ground truth data may be data representing objects and object labels. In another example, the ground truth data may be data representing images having various perspectives, depth map data corresponding to images having various perspectives, and/or semantic segmentation maps having various perspectives.

Figure 8:
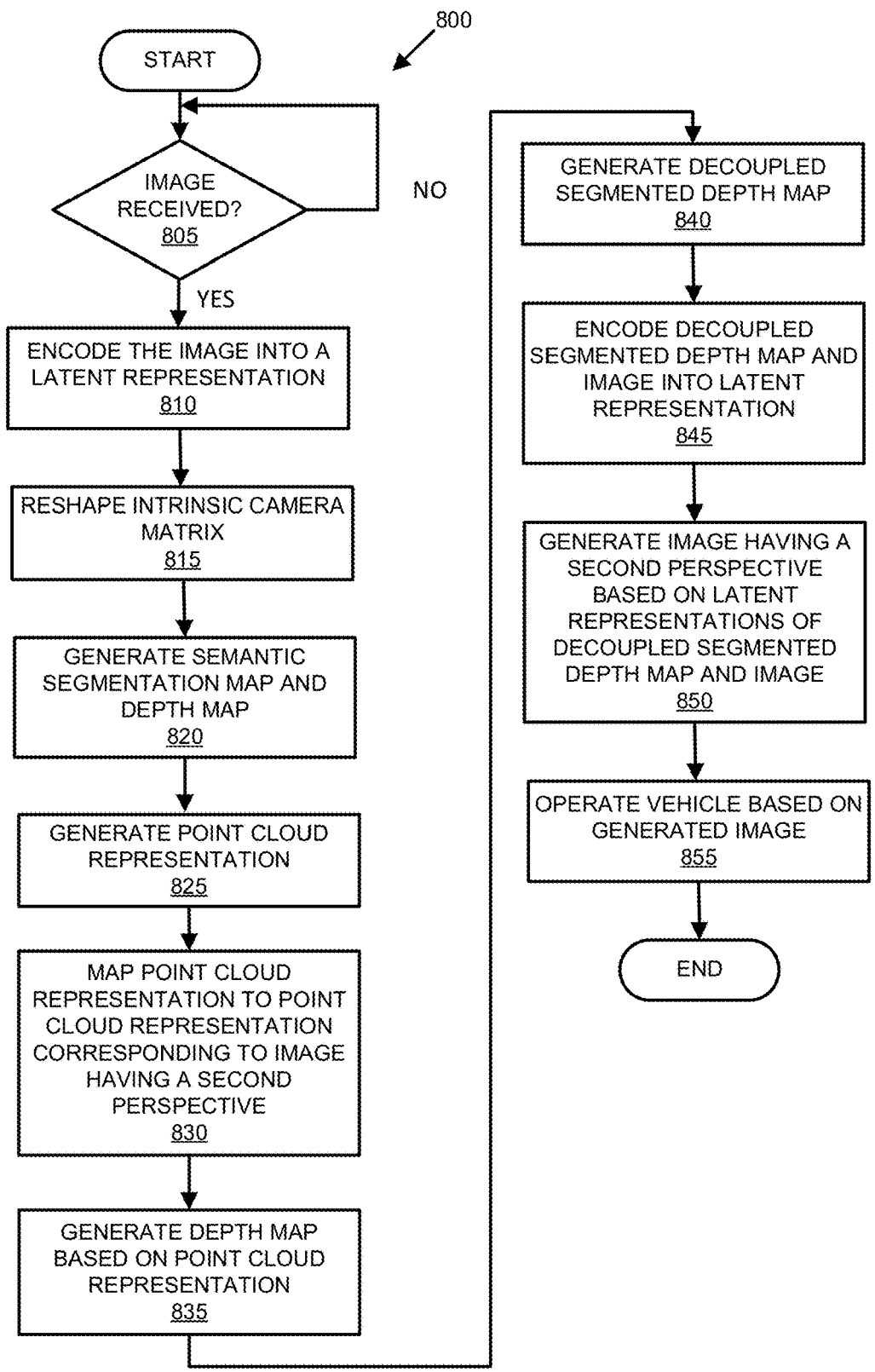
FIG. 8 is a flow diagram for an example process for generating a synthetic image having a second perspective using an image having a first perspective.

FIG. 8 is a flowchart of an exemplary process 800 for generating an image having a second perspective based on an image captured having a first perspective. Blocks of the process 800 can be executed by the computer 110 or the computer 235. At block 805, a determination is made whether an input image having a first perspective is received. If an image is not received, the process 800 returns to block 805. Otherwise, at block 810, encoders, such as encoders 412, 416 encode the received image into a latent representation, e.g., latent features, of the image. At block 815, an intrinsic camera matrix 412 for the camera sensor 115 is reshaped at a reshaping layer 406. At block 820, decoders, such as decoders 412, 416 generate a semantic segmentation map 414 and a depth map 418, respectively, based on the encoded representation of the input image. The generated depth map 414 is based on the encoded image and the reshaped camera matrix.

At block 825, a point cloud representation of the generated depth map 418 is created. At block 830, a point cloud representation corresponding to an image having a second perspective is generated. The point cloud representation corresponding to the image having a second perspective is generated is mapped using the point cloud representation of the generated depth map 418. At block 835, each point within the point cloud representation is projected onto a depth map 502 corresponding to the image having the second perspective. At block 840, decoders, such as decoders 516, 518 form the decoupled segmented depth map 520 using the depth map 502 and the semantic segmentation map 414, respectively. At block 845, encoders, such as encoders 522, 526, encode the decoupled segmented depth map 520 and the image 404 into a latent representation, respectively. A decoder 528 uses in the latent representations of the decoupled segmented depth map 520 and the image 404 to generate an image having the second perspective at block 850. At block 855, the vehicle 105 can be operated based on the generated image having the second perspective. For example, the computer 110 can transmit one or more signals to operate the vehicle 105 according to the generated image.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:

receive an image having a first perspective;

generate, via a deep neural network, a depth map corresponding to the image having the first perspective;

generate, via the deep neural network, a point cloud representation based on the depth map;

project the point cloud representation onto a point cloud representation corresponding to an image having a second perspective;

generate a depth map corresponding to the image having the second perspective; and generate a synthetic image having the second perspective based on the depth map corresponding to the image having the second perspective and a semantic segmentation map corresponding to the image having the first perspective, wherein the second perspective is different from the first perspective.

2. The system of claim 1, wherein the processor is further programmed to:

generate the point cloud representation corresponding to the image having the second perspective based on a camera pose transformation matrix.

3. The system of claim 2, wherein the camera pose transformation matrix comprises a rotation matrix and a translation matrix.

4. The system of claim 3, wherein the point cloud representation corresponding to the image having the second perspective is calculated according to $$\begin{bmatrix} x' \\ y' \\ z' \end{bmatrix} = [R^{-1}]\left\{\begin{bmatrix} x \\ y \\ z \end{bmatrix} - [T]\right\}, \text{ where } \begin{bmatrix} x' \\ y' \\ z' \end{bmatrix}$$

comprises point cloud coordinates for the point cloud representation corresponding to the image having the second perspective, $R^{-1}$ is an inverse matrix of the rotation matrix, $$\begin{bmatrix} x \\ y \\ z \end{bmatrix}$$

comprises point cloud coordinates for the point cloud representation corresponding to the image having the first perspective, and [T] comprises the translation matrix.

5. The system of claim 1, wherein the deep neural network comprises an encoder-decoder architecture.

6. The system of claim 5, wherein the deep neural network comprises a conditional generative adversarial network.

7. The system of claim 1, wherein the image having the first perspective is captured by a vehicle camera sensor.

8. The system of claim 1, wherein the image having the first perspective comprises a Red-Blue-Green (RGB) image.

9. The system of claim 1, wherein the processor is further programmed to:

operate a vehicle based on the synthetic image having the second perspective.

10. The system of claim 1, wherein the deep neural network includes a discriminator that generates a prediction indicative of whether the synthetic image having the second perspective is machine-generated or is sourced from a real data distribution.

11. A method comprising:

receiving an image having a first perspective;

generating, via a deep neural network, a depth map corresponding to the image having the first perspective;

generating, via the deep neural network, a point cloud representation based on the depth map;

projecting the point cloud representation onto a point cloud representation corresponding to an image having a second perspective;

generating a depth map corresponding to the image having the second perspective; and generating a synthetic image having the second perspective based on the depth map corresponding to the image having the second perspective and a semantic segmentation map corresponding to the image having the first perspective, wherein the second perspective is different from the first perspective.

12. The method of claim 11, further comprising:

generating the point cloud representation corresponding to the image having the second perspective based on a camera pose transformation matrix.

13. The method of claim 12, wherein the camera pose transformation matrix comprises a rotation matrix and a translation matrix.

14. The method of claim 13, wherein the point cloud representation corresponding to the image having the second perspective is calculated according to $$\begin{bmatrix} x' \\ y' \\ z' \end{bmatrix} = [R^{-1}] \left\{ \begin{bmatrix} x \\ y \\ z \end{bmatrix} - [T] \right\}, \text{ where } \begin{bmatrix} x' \\ y' \\ z' \end{bmatrix}$$

comprises point cloud coordinates for the point cloud representation corresponding to the image having the second perspective, $R^{-1}$ is an inverse matrix of the rotation matrix, $$\begin{bmatrix} x \\ y \\ z \end{bmatrix}$$

comprises point cloud coordinates for the point cloud representation corresponding to the image having the first perspective, and [T] comprises the translation matrix.

15. The method of claim 11, wherein the deep neural network comprises an encoder-decoder architecture.

16. The method of claim 15, wherein the deep neural network comprises a conditional generative adversarial network.

17. The method of claim 11, wherein the image having the first perspective is captured by a vehicle camera sensor.

18. The method of claim 11, wherein the image having the first perspective comprises a Red-Blue-Green (RGB) image.

19. The method of claim 11, further comprising:

operate a vehicle based on the synthetic image having the second perspective.

20. The method of claim 11, wherein the deep neural network includes a discriminator that generates a prediction indicative of whether the synthetic image having the second perspective is machine-generated or is sourced from a real data distribution.

* * * * *